(12) United States Patent
Wang

(10) Patent No.: US 7,308,162 B2
(45) Date of Patent: Dec. 11, 2007

(54) INTRINSIC FABRY-PEROT OPTICAL FIBER SENSORS AND THEIR MULTIPLEXING

(75) Inventor: Anbo Wang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/656,256

(22) Filed: Sep. 8, 2003

(65) Prior Publication Data

US 2004/0114848 A1 Jun. 17, 2004

Related U.S. Application Data

(60) Provisional application No. 60/408,353, filed on Sep. 6, 2002.

(51) Int. Cl.
*G02B 6/00* (2006.01)
*G02B 6/34* (2006.01)
*G02F 1/295* (2006.01)

(52) U.S. Cl. .............................. 385/12; 385/10; 385/37

(58) Field of Classification Search ................... 385/12
See application file for complete search history.

(56) References Cited

U.S. PATENT DOCUMENTS

| | | | |
|---|---|---|---|
| 4,400,056 A * | 8/1983 | Cielo | 385/27 |
| 4,806,012 A | 2/1989 | Meltz et al. | |
| 4,994,791 A | 2/1991 | Taylor | |
| 5,301,001 A | 4/1994 | Murphy et al. | |
| 5,682,237 A | 10/1997 | Belk | |
| 5,699,468 A * | 12/1997 | Farries et al. | 385/140 |
| 5,706,375 A * | 1/1998 | Mihailov et al. | 385/24 |
| 5,841,131 A * | 11/1998 | Schroeder et al. | 250/227.17 |
| 5,943,124 A * | 8/1999 | Haigh | 356/73.1 |

(Continued)

FOREIGN PATENT DOCUMENTS

JP 10-177112 6/1998

OTHER PUBLICATIONS

The Photonics Dictionary, 1996, D-50.*
Hill, K.O., et al., "Photosensitivity in optical fiber waveguides: Application to reflection filter fabrication", Appl. Phys. Lett., vol. 32, No. 10, pp. 647-649, May 15, 1978.

(Continued)

*Primary Examiner*—Kaveh Kianni
(74) *Attorney, Agent, or Firm*—DLA Piper US LLP

(57) ABSTRACT

An intrinsic Fabry-Perot optical sensor includes a thin film sandwiched between two fiber ends. When light is launched into the fiber, two reflections are generated at the two fiber/thin film interfaces due to a difference in refractive indices between the fibers and the film, giving rise to the sensor output. In another embodiment, a portion of the cladding of a fiber is removed, creating two parallel surfaces. Part of the evanescent fields of light propagating in the fiber is reflected at each of the surfaces, giving rise to the sensor output. In a third embodiment, the refractive index of a small portion of a fiber is changed through exposure to a laser beam or other radiation. Interference between reflections at the ends of the small portion give rise to the sensor output. Multiple sensors along a single fiber are multiplexed using an optical time domain reflectometry method.

7 Claims, 4 Drawing Sheets

U.S. PATENT DOCUMENTS

| | | | |
|---|---|---|---|
| 5,951,881 A * | 9/1999 | Rogers et al. | 216/41 |
| 6,067,391 A * | 5/2000 | Land | 385/27 |
| 6,215,927 B1 * | 4/2001 | Singh | 385/37 |
| 6,233,746 B1 | 5/2001 | Skinner | |
| 6,335,524 B1 | 1/2002 | Udd et al. | |
| 6,541,956 B2 * | 4/2003 | Kawanishi et al. | 324/158.1 |
| 2002/0076149 A1 * | 6/2002 | Deacon | 385/27 |
| 2002/0146047 A1 * | 10/2002 | Bendett et al. | 372/40 |

OTHER PUBLICATIONS

Meltz, G., et al., "Formation of Bragg gratings in optical fibers by a transverse holographic method", Optics Letters, vol. 14, No. 15, pp. 823-825, Aug. 1, 1989.

Supplementary European Search Report, European Patent Application No. 03752054.1, dated May 3, 2007.

* cited by examiner

INTRINSIC FABRY-PEROT OPTICAL FIBER SENSORS AND THEIR MULTIPLEXING

CROSS REFERENCE TO RELATED APPLICATIONS

This application claims the benefit of U.S. Provisional Application Ser. No. 60/408,353, filed Sep. 6, 2002, the contents of which are hereby incorporated by reference herein.

This invention was made with government support under Contract Number DE-FT36-01G011-50 awarded by the US Department of Energy. The government may have certain rights in the invention.

BACKGROUND OF THE INVENTION

1. Field of the Invention

The invention relates to optical fiber sensors generally, and more specifically to Fabry-Perot optical fiber sensors, methods for making such sensors, and methods for multiplexing Fabry-Perot and other types of optical fiber sensors.

2. Discussion of the Background

Optical fiber sensors are becoming more popular for a wide variety of applications. Optical fiber sensors offer several advantages over other types of sensors such as electronic and mechanical sensors. Optical fiber sensors are generally more rugged and have longer lifetimes than these other types of sensors, are immune from electromagnetic interference, can often be made much smaller than these other types of sensors, and offer multiplexing capabilities.

One type of optical fiber sensor known in the art is the interferometric optical fiber sensor. An external Fizeau fiber optic sensor is described in U.S. Pat. No. 5,301,001 to Murphy et al. The sensor described in that patent is formed by placing two optical fibers in a silica tube separated by an air gap. When light is launched into one of the fibers, interfering Fresnel reflections caused by the air/fiber interfaces at the ends of the fibers are formed. Changes in the length of the cavity resulting from changes in temperature, pressure or mechanical strain on the optical fiber produce changes in phase between the reflections. This results in measurable changes in the amplitude of the reflected light. By measuring the changes in amplitude, the corresponding temperature/pressure/mechanical strain can be determined.

SUMMARY

The present invention provides methods for creating Fabry-Perot optical fiber sensors. In one embodiment of the invention, a thin dielectric film is sandwiched between two fiber ends. When light is launched into the fiber, two Fresnel reflections are generated at the two fiber/thin film interfaces due to a difference in refractive indices between the optical fibers and the dielectric thin film. Interference between the two reflections give rise to the sensor output. In another embodiment, a portion of the cladding of a fiber is removed while leaving the core intact, creating two surfaces which are preferably parallel and perpendicular to the core. Part of the evanescent fields of light propagating in the fiber is reflected at each of the two surfaces. Interference between the reflections at the two surfaces give rise to the sensor output. In a third embodiment of the invention, the refractive index of a small portion of a fiber is changed through exposure to a laser beam or other radiation. Again, interference between Fresnel reflections at the two ends of the small portion give rise to the sensor output.

In a second aspect of the invention involves multiplexing optical sensors using an optical time domain reflectometry method. An optical pulse is launched into a fiber in which multiple sensors have been created at different locations along the fiber. At each of the sensors, a portion of the optical pulse is reflected and the remainder continues propagating along the fiber. The reflections from each of the sensors are separated by a time proportional to the distance along the fiber by which the sensors are separated. By measuring the ratio of each peak to the background signal around the peak, the fiber loss factor can be canceled in the sensor output reading. Thus, by measuring the arrival time and amplitudes of the peaks, distributed measurement can be achieved.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein.

DETAILED DESCRIPTION

The present invention will be discussed with reference to preferred embodiments of optical fiber sensors and preferred embodiments of making and multiplexing the same. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Methods For the Fabrication of Intrinsic Fabry-Perot Optical Fiber Sensors

Figure 1:
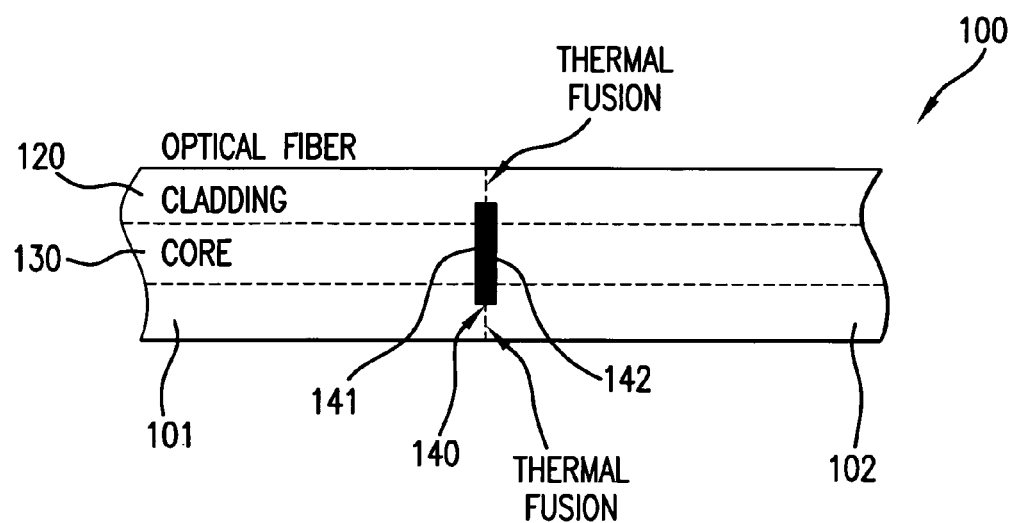
FIG. 1 is a side view of an optical fiber sensor according to a first embodiment of the invention.

The first embodiment of an intrinsic Fabry-Perot optical fiber sensor 100 is illustrated in FIG. 1. The sensor 100 employs a thin dielectric layer 140 sandwiched between two fiber ends 101, 102 with cleaved or polished ends. Each of the fibers 101, 102 is a conventional optical fiber including a cladding 120 surrounding a core 130. The dielectric layer 140 is preferably a thin film having a refractive index different from the refractive index of the fibers 101, 102. The two fibers 101, 102 with the sandwiched thin dielectric layer 140 form an intrinsic Fabry-Perot fiber interferometer. When light is launched into one of the fibers 101, 102, Fresnel reflections are generated at each of the two fiber/thin film interfaces 141, 142 due to the difference in the refractive indices of the fibers 101, 102 and thin film 140. The two reflections propagate backward along the lead-in fiber 101, 102. The interference of the two reflections give rise to the sensor output. Any parameter, such as strain, temperature or pressure, that can change the optical distance of the thin film will change the returned optical intensity and can therefore be measured.

There are several methods for the fabrication of the intrinsic Fabry-Perot (FP) sensor 100 involving a dielectric thin film as described above and shown in FIG. 1. One method is to coat one or both of the ends of the fibers 101, 102, which can be accomplished using various physical or chemical techniques such as sputtering and chemical vapor deposition. Once desirable thickness of the thin film 140 is achieved, the two fibers 101, 102 are then spliced using a thermal fusion technique. One advantage of the sensors fabricated in this manner is that a large number of fibers with identical thin films 140 can be deposited because of the batch process nature of the methods by which the thin film 140 may be formed.

A second method of fabricating the FP sensor 100 is to arrange the two fibers 101, 102 with bare cleaved or polished ends separated by an air gap of a desirable width. The fibers 101, 102 are then exposed to the vapor of a dielectric material for a period of time so that some of the vapor material is deposited on the fiber ends. The fibers 101, 102 are then spliced together using a thermal fusion technique.

Several factors for the selection of the dielectric material are important:

1. The refractive index of thin film material must be different from that of the fibers;
2. The thin film material should show reasonable transparency for the optical wavelength used to interrogate the sensor;
3. The thin film material should not be burned during the thermal fusion.

Examples of suitable dielectric materials include magnesium oxide and titanium dioxide. Preferred dielectric thicknesses range from 1 nanometer to 100 microns, although it should be recognized that thicknesses outside of this range are also within the purview of the invention.

Figure 2:
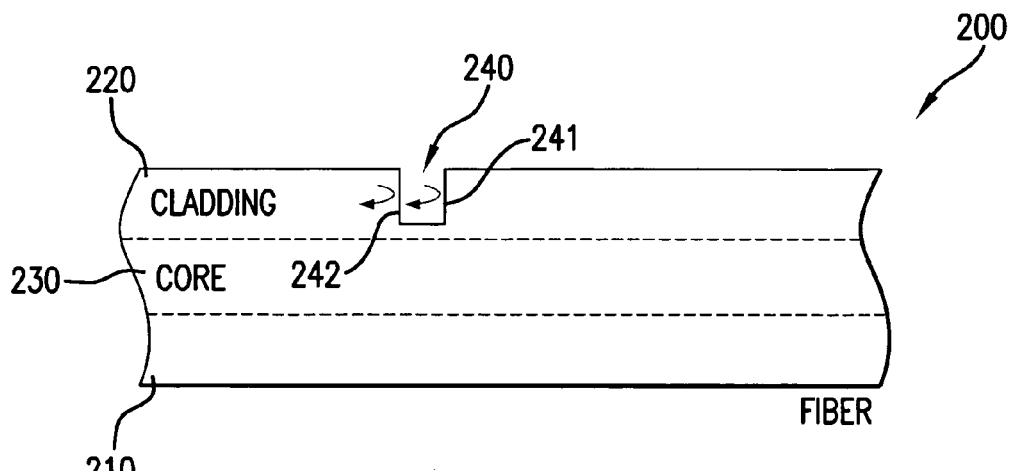
FIG. 2 is a side view of an optical fiber sensor according to a second embodiment of the invention.

An intrinsic FP sensor 200 according to a second embodiment of the invention is shown in FIG. 2. In the sensor 200, part of the fiber cladding 220 surrounding the core 230 is removed to create a void 240. The void 240 preferably has two parallel vertical surfaces 241, 242. There are a number of ways to locally remove the fiber cladding to form the void 240. One method is wet chemical etching. Another method is reactive ion dry etching. The partial removal of the fiber cladding 220 can be circumferentially uniform or non-uniform as shown in FIG. 2.

When light propagating in the fiber 210 strikes the surfaces 241, 242 of the void 240 in the cladding 220, part of the evanescent fields of the light is reflected so two reflections are generated, one at each of the surfaces 241, 242. Any desirable light reflectivity can be obtained by changing the cross-sectional area and the depth of the void 240. The two reflections propagate backward along the lead-in fiber 210. The interference of the two reflections give rise to the sensor output. Any parameter, such as strain, temperature or pressure, that can change the optical distance between the two reflections will change the returned optical intensity and can therefore be measured.

A third method for fabricating an intrinsic FP optical fiber sensor involves changing the refractive index in a portion of the core of an optical fiber. In 1978, K. Hill et al., reported that the refractive index of a germanium-doped silica glass fiber can be permanently altered by photo exposure to a laser beam at 488 nm. In 1989, a research group at the United Technology Research Center reported that the index change efficiency can be dramatically improved by photo exposure to lasers around 244 nm and further a fiber grating can be written from the side of a fiber.

Figure 3A:
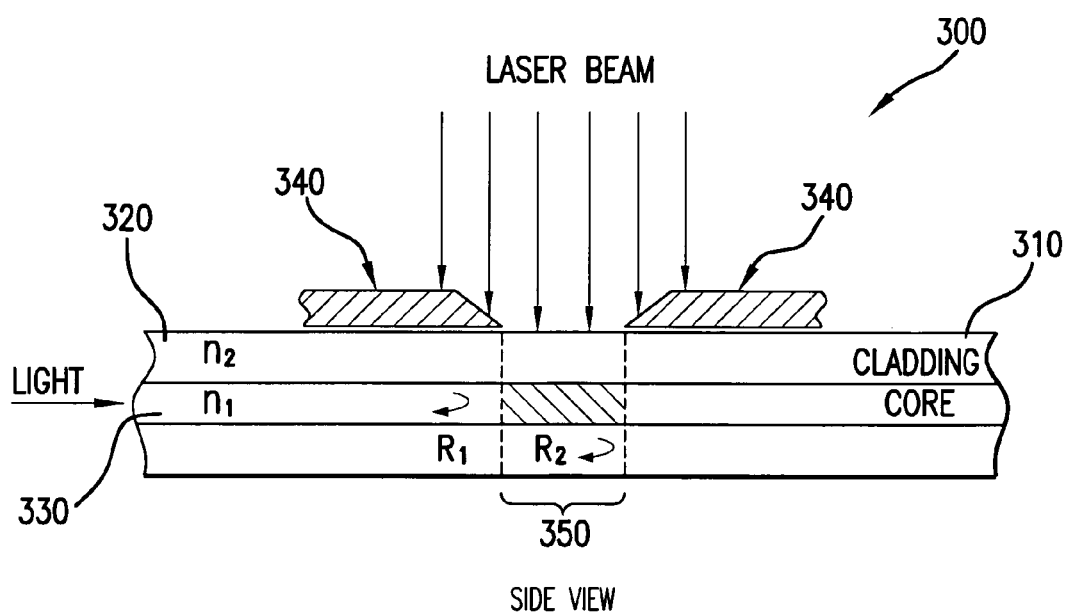
FIGS. 3(a) and 3(b) are side and top views, respectively, illustrating the fabrication of an optical fiber sensor according to a third embodiment of the invention.
Figure 3B:
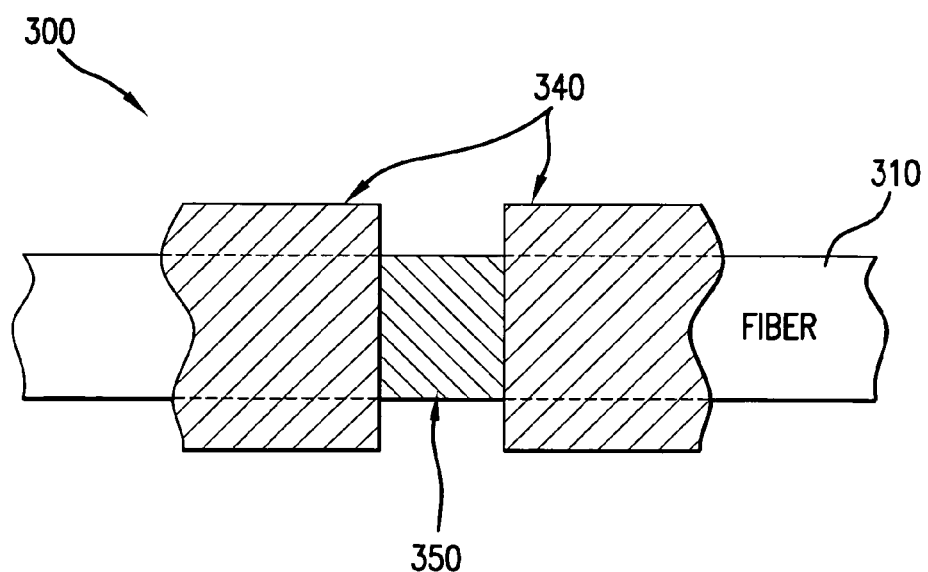

FIGS. 3*a* and 3*b* illustrate an intrinsic Fabry-Perot optical fiber interferometer 300 fabricated by changing the refractive index of a fiber over a very small fiber section 350 through exposure to a laser beam. This method uses a laser beam as an example, but the method could also be realized by exposure to other high energy radiation, such as energized ion beams.

A laser beam at a certain wavelength at which the fiber index can be permanently changed is incident to a fiber 310. The photo exposure is well defined by a mask 340 above the fiber 310. In the photo exposed region 350, the index of the fiber core 330 (or, in other embodiments, the index of the cladding 320 or the indices of both the cladding 320 and the core 330) is changed. For a germanium doped silica fiber, the index is generally increased. Because of the well defined edges of the index changes, when a light is launched into the fiber, two Fresnel reflections R1, R2 are generated due to the abrupt index changes as shown in the figure. The interference of the two reflections then yield the output of the FP interferometer.

The FP cavity length is determined by the width of the mask 340 along the axis of the fiber 310. Once the FP cavity is fabricated, any change in the cavity length or the index of refraction within the FP cavity will give rise to changes in the output interference and can therefore be measured. There are many parameters that can change the cavity length or index or both. These include, but are not limited to, temperature, strain and pressure.

This is similarly to the process used to create Fiber Bragg gratings in fiber. However, instead of creating a periodic pattern (many closely spaced small cavities) in the fiber as done in Fiber Bragg gratings, only one cavity albeit generally longer in length, is written in the fiber for each sensor.

Sensor Multiplexing Based On Optical Time Domain Reflectometry

Since the sensors fabricated with the methods described above are fiber-in-line elements, they can be designed to reflect only a small fraction of the incident optical power. The remaining light can still propagate down the fiber. It is therefore possible to multiplex many such sensor elements along a fiber.

Figure 4:
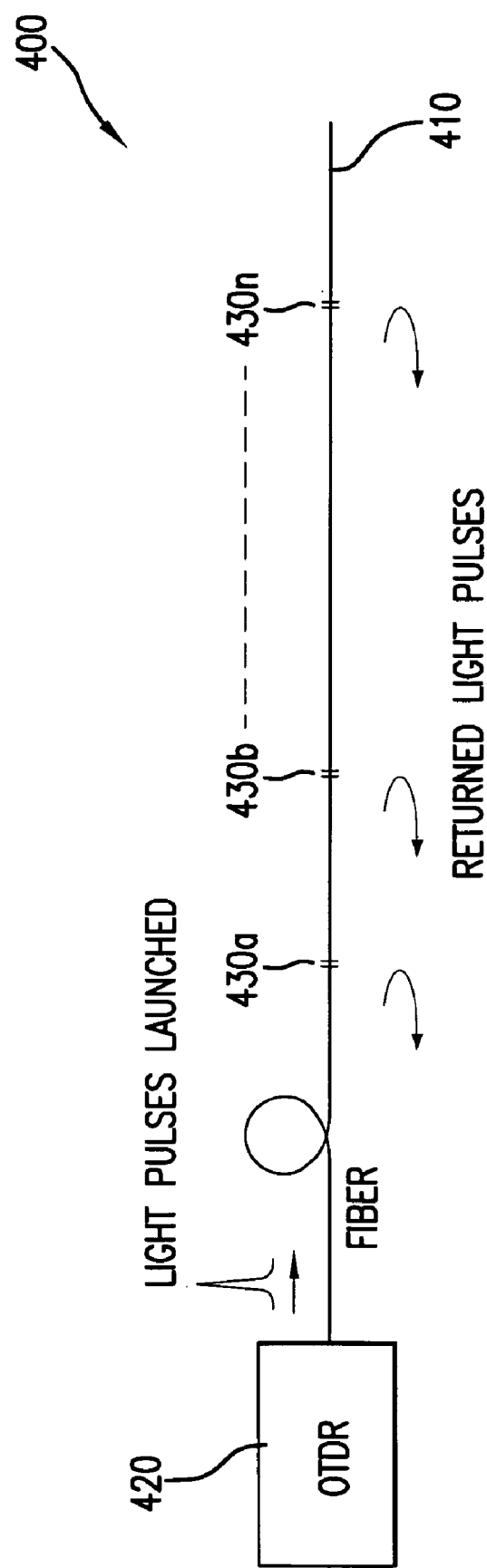
FIG. 4 is a schematic diagram of a system for multiplexing fiber optic sensors using an optical time domain reflectometry technique according to a fourth embodiment of the invention.

The second aspect of the invention provides a method for the multiplexing of such sensors along a fiber. This method is based on optical time domain reflectometry. The basic principle is illustrated by the system 400 of FIG. 4.

An optical pulse is launched by an optical time domain reflectometer (OTDR) into an optical fiber 410 along which a number of intrinsic FP sensors 430*a-n*, which in this case are dielectric thin film sensors of the type described in connection with FIG. 1, are implemented at different locations. As the optical pulse propagates down the fiber 410, owing to the Raleigh back scattering, it is partially reflected in a distributed manner along the fiber 410.

Figure 5:
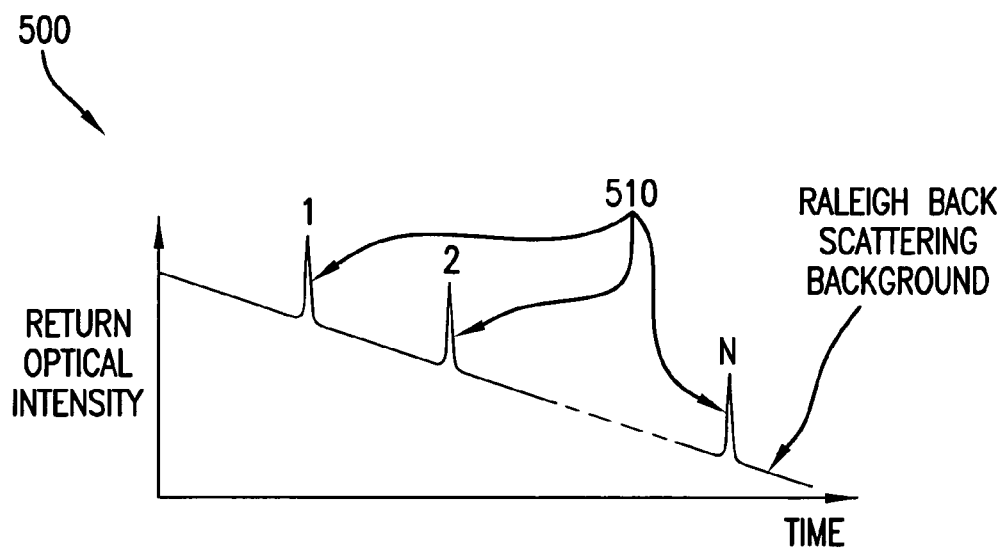
FIG. 5 is a plot of optical intensity vs. time for the system of FIG. 4.

As the pulse reaches the first FP interferometer 430*a*, two reflections are generated at the two fiber/thin film interfaces involved in the FP cavity. The two reflections are usually much stronger than the Raleigh back scattering. As a result, a peak 510-1 in the reflection occurs as shown in FIG. 5. The magnitude of the peak 510-1 is dependent on the differential phase delay between the two reflections. Therefore, the magnitude of the peak 510-1 provides information about the FP cavity length.

Figure 6:
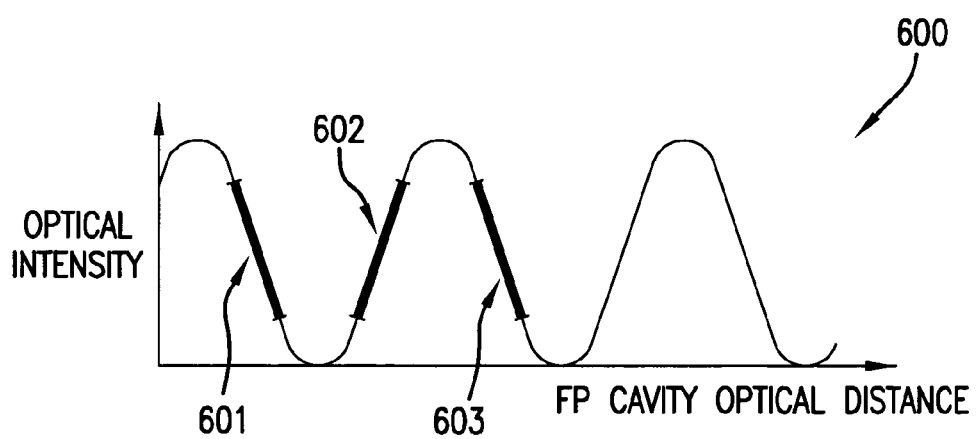
FIG. 6 is a plot of optical intensity vs. optical cavity distance illustrating linear ranges of multiplexed Fabry-Perot sensors in the system of FIG. 4.

However, the magnitude of the peak 510-1 will vary periodically as the FP cavity length is continuously changed. To avoid ambiguity in the determination of the cavity length by reading the peak magnitude, the interferometers 430 are preferably designed such that the cavity length varies only over the quasi-linear range of a half fringe as illustrated in FIG. 6. Thus, the FP length can be uniquely determined by measuring the magnitude of the optical reflection peaks 510 with OTDR device 420. Usually the FP cavity length is operated over the very first linear range 601 or one of the first available linear ranges 602, 603 as shown in FIG. 6. This is to minimize the sensitivity of the peak magnitude to source wavelength shift, which is proportional to the initial FP cavity length. Moreover, the Raleigh back scattering background as shown in FIG. 5 also provides an excellent opportunity for self calibrating measurement because it carries the information of fiber losses. By taking the ratio of the return sensor signal to the Raleigh scattering background around the sensor peak 510-1, the fiber loss factor can be canceled in the sensor output reading.

The sensors 430 are preferably designed such that only a small amount of light is reflected at each sensor when the sensor is subjected to operating conditions giving rise to a maximum reflection. This is done so that light reflected from upstream sensors does not give rise to false readings from downstream sensors. However, the amount of reflected light must be large enough such that the reflections are much stronger than the Raleigh back scattering as described above. The actual maximum reflectivity for each sensor depends on the system noise and the number of sensors to be multiplexed for each system. In some systems, a maximum sensor reflectivity of 0.1% may be appropriate. Thus, if the first sensor in such a system were subjected to conditions giving rise to maximum reflectivity, 99.9% of the light pulse is transmitted through the first sensor to the second sensor. Assuming the second sensor is also at a maximum reflectivity, the third sensor would "see" 99.8% of the light pulse, the fourth would see 99.7%, and so on. The small amounts of light reflected by upstream sensors allows for a relatively large amount of light available for reflection by downstream sensors.

The transmitted optical signal through the first FP cavity 430a will then continue to propagate along the fiber to the second FP cavity 430b, where another pair of reflections is generated. This second pair has a certain time delay determined by the length of the fiber 410 between the two FP elements 430a,b and the effective index of refraction of the fiber 410. Thus, a second peak 510-2 is created in the return signal, but at a different time as shown in FIG. 5. In this manner, a large number of FP sensor elements can be cascaded along the fiber to realize quasi-distributed self-calibrating measurement.

In some embodiments of the invention, the sensors 430 are arranged in pairs with one on sensor of the pari isolated from the measured in order to effect calibration. For example, in a strain measurement system, a protective tube is placed around one of the sensors 430 from strain. The temperature effects as measured by the isolated sensor 430 can then be subtracted from the other, non-isolated sensor in order to obtain a true strain measurement from the non-isolated sensor.

The same sensor multiplexing principle described above can also be used to many other types of sensors, such as extrinsic Fabry-Perot sensors and fiber Bragg gratings. When fiber Bragg gratings are used, the grating will be designed so that its Bragg wavelength is on one side of the 'Gaussian-like' spectrum. Any change to grating period will yield a shift to its Bragg wavelength. The reflected optical intensity will then be changed. If the grating sensor is designed such that over the measurement range of a parameter, such as strain or temperature, which can change the grating period, the Bragg wavelength shifts remain on one side of the laser spectrum, a unique relation between the reflected optical intensity and the measurand can be established. Therefore, by reading the magnitudes and arrival times of the reflection peaks seen by the OTDR instrument, distributed measurement can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A method comprising the steps of:
   performing the steps of:
   forming a mask over an optical fiber, the optical fiber having a core surrounded by a cladding, the mask having a single opening;
   exposing the opening to light propagating outside the optical fiber such that a refractive index of a portion of the fiber corresponding to the opening is changed to form a Fabry-Perot cavity sensor, whereby light propagating in the optical fiber after the Fabry-Perot cavity sensor is formed is reflected at a first end and at a second end of the portion and propagates backward along the optical fiber, light reflected at the first end of the portion interfering with light reflected from the second end of the portion such that changes in a length of the portion result in observable changes in an amplitude of such reflected light;
   to form a first Fabry-Perot sensor in an optical fiber;
   repeating the forming and exposing steps at least once such that a plurality of sensors are formed in the optical fiber; the plurality of sensors being spaced apart;
   launching an optical pulse into the optical fiber, the optical fiber having a plurality of optical sensors formed therein, the pulse having a duration less than a time required to travel a smallest distance between the two most closely spaced sensors; and
   measuring amplitudes of backward-propagating reflection peaks in the fiber at a plurality of times, each of the times corresponding to a location of one of the plurality of sensors.

2. The method of claim 1, wherein the exposing step results in a change in a refractive index of the core.

3. The method of claim 1, wherein the exposing step results in a change in a refractive index of the cladding.

4. The method of claim 1, wherein the exposing step results in a change in a refractive index of the core and the cladding.

5. The method of claim 1, wherein the exposing step is performed using a laser beam.

6. The method of claim 1, wherein the fiber is doped with germanium.

7. The method of claim 1, wherein the Fabry-Perot sensors are designed such that a cavity length varies only over a quasi-linear range of a half fringe under conditions to which the Fabry-Perot sensors are exposed.

* * * * *